(12) United States Patent
Schlief

(10) Patent No.: US 9,844,894 B2
(45) Date of Patent: Dec. 19, 2017

(54) MILLING HEAD FOR AN UNDERWATER GRANULATING INSTALLATION

(71) Applicant: NORDSON HOLDINGS S.A.R.L. & C.O. KG, Erkrath (DE)

(72) Inventor: Dirk Schlief, Dulmen (DE)

(73) Assignee: Nordson Holdings S.A.R.L. & Co. KG, Erkrath (DE)

( * ) Notice: Subject to any disclaimer, the term of this patent is extended or adjusted under 35 U.S.C. 154(b) by 339 days.

(21) Appl. No.: 14/402,581

(22) PCT Filed: May 29, 2013

(86) PCT No.: PCT/DE2013/100194
§ 371 (c)(1),
(2) Date: Nov. 20, 2014

(87) PCT Pub. No.: WO2013/178220
PCT Pub. Date: Dec. 5, 2013

(65) Prior Publication Data
US 2015/0129699 A1    May 14, 2015

(30) Foreign Application Priority Data

May 30, 2012    (DE) .................... 20 2012 101 980 U

(51) Int. Cl.
*B02C 18/18*    (2006.01)
*B29B 9/06*    (2006.01)
(Continued)

(52) U.S. Cl.
CPC ............ *B29B 9/065* (2013.01); *B02C 18/148* (2013.01); *B02C 18/184* (2013.01); *B02C 18/186* (2013.01); *B26D 7/2614* (2013.01)

(58) Field of Classification Search
CPC ..... B02C 18/148; B02C 18/188; B02C 18/18; B02C 18/184
(Continued)

(56) References Cited

U.S. PATENT DOCUMENTS 5,060,875 A    10/1991    McBride
6,386,469 B1    5/2002    Meister et al.
(Continued)

FOREIGN PATENT DOCUMENTS

CN    1239299 C    12/1999
CN    201889216 U    7/2011
(Continued)

OTHER PUBLICATIONS

Chinese Patent Application No. 201380027842, Notification of First Office Action dated Oct. 22, 2015, 10 pages.
(Continued)

*Primary Examiner* — Faye Francis
(74) *Attorney, Agent, or Firm* — Baker & Hostetler LLP

(57) ABSTRACT

A cutter head for an underwater granulating installation has a rotor body having a plurality of cutter-retaining arms. Each of the plurality of cutter-retaining arms adjoins the outer circumference, and one cutter element is fastened on each of the plurality of cutter-retaining arms, where the rotor body in the region of each cutter-retaining arm includes at least one receptacle recess configured to receive a fastening element. The cutter element is integrally configured to have a basic body and at least one blade body. The basic body is positioned on a lower bearing face of the rotor body, and the lower bearing face extends up to at least one of the plurality of cutter-retaining arms. The at least one of the plurality of cutter-retaining arms on an upper side is overlapped by the cutter element, and the blade body includes at least one cutting edge molded thereon.

14 Claims, 6 Drawing Sheets

(51) Int. Cl.
*B02C 18/14* (2006.01)
*B26D 7/26* (2006.01)

(58) Field of Classification Search
USPC .......................................................... 241/294
See application file for complete search history.

(56) References Cited

U.S. PATENT DOCUMENTS

| | | | | |
|---|---|---|---|---|
| 6,832,738 | B2* | 12/2004 | Wessling | B29B 9/065 241/294 |
| 6,840,471 | B2* | 1/2005 | Roozeboom | B02C 13/06 241/197 |
| 7,134,622 | B2* | 11/2006 | Biller | B27L 11/005 144/241 |
| 7,380,576 | B2* | 6/2008 | Pizzuto | A01B 33/103 144/241 |
| 7,487,931 | B2* | 2/2009 | Monyak | B02C 13/2804 241/197 |
| 7,524,178 | B2 | 4/2009 | Rosse et al. | |
| 7,578,462 | B2* | 8/2009 | Edwards | A01B 33/103 241/101.77 |
| 7,753,302 | B2* | 7/2010 | Zollig | B02C 13/14 241/195 |
| 7,810,531 | B2* | 10/2010 | Labbe | A01G 23/00 144/172 |
| 7,926,400 | B2 | 4/2011 | Dahlheimer | |
| 7,938,350 | B2* | 5/2011 | Doppstadt | B02C 18/145 241/294 |
| 8,066,213 | B2* | 11/2011 | Marquardsen | B02C 13/06 241/242 |
| 8,146,849 | B2* | 4/2012 | Bacon | A01F 29/095 241/242 |
| 8,167,225 | B2* | 5/2012 | Gaudreault | A01D 34/835 241/101.77 |
| 8,167,226 | B2* | 5/2012 | Engnell | B27L 11/005 241/294 |
| 8,205,650 | B2* | 6/2012 | Zinniger | B27G 13/04 144/172 |
| 8,550,391 | B2* | 10/2013 | Denis | A01G 23/00 241/294 |
| 2013/0042738 | A1 | 2/2013 | Iwasaki et al. | |
| 2013/0043616 | A1 | 2/2013 | Deiss | |
| 2015/0129699 | A1 | 5/2015 | Schlief | |

FOREIGN PATENT DOCUMENTS

| | | |
|---|---|---|
| DE | 719800 C | 4/1942 |
| DE | 102004049862 A1 | 4/2006 |
| EP | 1745704 A1 | 1/2007 |
| JP | 06-178946 A | 6/1994 |
| JP | 2008-515685 A | 5/2008 |
| JP | 2009-501622 A | 1/2009 |
| JP | 2002531283 A | 2/2013 |
| JP | 2013525143 A | 6/2013 |
| WO | 0032367 A1 | 6/2000 |
| WO | 2011131344 A1 | 10/2011 |
| WO | 2013178220 A1 | 12/2013 |

OTHER PUBLICATIONS

International Search Report from International Patent Application No. PCT/DE2013/100194, dated Sep. 25, 2013, 7 pages.

Japan Patent Application No. 2015-514350; Decision to Grant; dated May 2, 2017; 6 pages.

\* cited by examiner

MILLING HEAD FOR AN UNDERWATER GRANULATING INSTALLATION

RELATED APPLICATIONS

This application is a 35 U.S.C. 371 national stage filing from International Application No. PCT/DE2013/100194 filed May 29, 2013, which claims priority to German Application No. 20 2012 101 980.9 filed May 30, 2012, the teachings of which are incorporated herein by reference.

The invention relates to a cutter head for an underwater granulating installation, at least comprising one rotor body having a multiplicity of cutter-retaining arms which adjoin the outer circumference and on which in each case one cutter element is fastened, wherein the rotor body in the region of each cutter-retaining arm displays at least one receptacle recess for a fastening element.

Underwater granulating installations serve in the manufacturing of free-flowing plastic granules. The thermoplastic material is melted and pressed through a perforated plate by means of an extruder. The strand exiting from the perforated plate is severed by a cutter which rotates directly along the perforation opening. On account of the cooling in the water bath in which the cutter head rotates, the molten plastic solidifies to form a solid particle.

Each cutter head contains a multiplicity of cutter blades. Since the latter directly scrape along the perforated plate, they have to be manufactured from a hard material. Individual cutters should also be replaceable if and when a cutting edge becomes blunt or is damaged, without having to replace the entire cutter head.

The cutting plates are usually screwed to the retaining arms which project on the outer periphery of the cutter head, specifically in a tangential direction. The screws thus have to be introduced into the intermediate space between the individual cutters and inserted and screwed tight in the tangential direction, on account of which assembly is complicated, on the one hand, and the number of the cutter blades which are placeable on a specific outer diameter is limited so that sufficient free space exists between the individual cutting edges, on the other hand. Moreover, in the known embodiment, the screw head lies in the intermediate space between adjacent cutting edges and thus forms an obstacle to the granules to be conveyed away.

A cutter head for an underwater granulating machine, which possesses a rotor basic body having retaining arms which project on the outer circumference, is known from DE 198 55 617 C2. Here, a groove which extends up and into the region of the projecting retaining arms and which is provided for receiving a replaceable cutting plate is provided in the rotor basic body. The cutting plate which is inserted into the groove is pressed thereonto and thus fastened by way of a tension bush which is located in the inner region of the rotor basic body and is configured so as to be eccentric. It is achieved in this manner that the free space between two cutting edges or two retaining arms, respectively, remains free for the removal of granulate, without an interfering blade head being in the way. On account of the high revolutions or high forces, the fastening which is only frictionally engaged may come loose, so that in turn securing measures on the clamp screw are required. Moreover, the distribution of force is unfavorable, since the cutting forces have to be absorbed by the comparatively thin cutting plate and can only be dissipated in the regions overlapping with the lateral flanks of the groove. Thickening of the cutting plates leads to the groove having to be widened, such that in turn the retaining arms have to be widened and overall the number of blades which are to be placed so as to be distributed along the circumference has to be reduced.

It is thus an object of the invention to provide a cutter head for an underwater granulating machine of the type mentioned at the outset, in which as high as possible a number of highly resilient and at the same time easily replaceable cutter elements can be disposed.

This object is achieved by a cutter head having the features of claim 1.

On account of the blade bodies being connected to a basic body to form an integral cutter element, stresses which are generated by forces during the instant of the cutting operation are distributed more uniformly in the entire cutter element, thus avoiding stress peaks. The integral embodiment facilitates manufacturing using a prototype method, such as metal casting, metal sintering, or other shape-imparting production methods.

In the region of stress peaks, in particular in the transition from the rearward region of the blade body and the basic body, additional ribs may be provided in order to optimize the stress profile.

It is essential for the blade body and the basic body to be integrally configured. The blade may be directly configured on the blade body. Said blade may also contain by way of an additional blade-insert element on which the blade is configured. The blade-insert element may be composed of another material. However, said blade-insert element is not placed onto the blade body in a releasable manner, but is in any case connected to the blade body in a materially integral manner, be it by way of soldering, welding, or adhesive bonding. Said blade-insert element is also supported in the rearward region by the blade body. The additional blade-insert element may be employed both in the case of cutter elements having blade bodies which are oriented in a straight manner, and in the case of cutter elements having a blade body which is oriented in an oblique manner.

It is also essential in the invention that the basic body is placed upon the rotor body by way of a lower bearing face and the bearing face extends up to at least one cutter-retaining arm, wherein the cutter-retaining arm on its upper side is overlapped by the cutter element. In this manner, far outwardly reaching support of the cutter element by the cutter-retaining arm is achieved, on the one hand; on the other hand, the gaps between the cutter-retaining arms and cutter elements placed thereupon make for improved removal of the granulate toward the rear side of the cutter head. On account of the complete overlap of the retaining arms by the cutter element placed thereupon, a backlog of granulate on the cutter-retaining arms is likewise avoided. The circumference on the lower side of the cutter element may even have a certain amount of oversize in relation to the bearing faces on the cutter-retaining arms, such that no edges whatsoever on which granulate could catch are present.

It is furthermore advantageous for the cutter element to be fastened still within the inner region of the rotor basic body, that is to say in a region which can be configured in a solid manner and in which no consideration needs to be made for the removal of the granulate.

Fastening takes place preferably using screws at the end side, coming from the rotor basic body. The screw heads thus do not project in any way into the conveying path of the granulate. It is in particular provided for an abatement to be machined into the cutter element, in order to accommodate the screw head in a recessed manner.

All centrifugal forces on the rotating cutter head can be absorbed by the fastening element, in particular a screw. For the forces which are transverse thereto as well, that is to say which are in the tangential direction, on account of the bearing face of the cutter element being clamped in relation to the rotor basic body having its cutter-retaining arms, by the screw joint alone fixation by way of frictional engagement is already achieved.

In order to absorb the high tangential forces which are being created in the instant of contact by the perforated plate of the extruder and the severing of granulate, an additional form-fitting coupling is preferably provided between the cutter element and the respective cutter-retaining arm on the rotor head. In this manner, the cutter element is then fixed in a form-fitting manner on two points on the rotor basic body, with a second screw joint having to be provided, which accelerates the mounting and demounting operation in the event of a cutter being replaced. The additional form-fitting support on the cutter-retaining arm in turn reduces the load on the screw connection and lowers the risk of loosening of the screw connection.

The form-fitting coupling on the cutter-retaining element preferably takes place directly in the region of the blade body, such that in turn the basic body of the cutter element and the transition between the basic body and the blade body can be configured so as to be leaner and weight can be saved in this manner.

The body of the blade or the cutting edge located thereon, respectively, may be oriented so as to be parallel to the central axis of the rotor head.

An oblique positioning of the cutting edge by about 40° to 50° in relation to the central axis of the rotor head is also possible. On account of the oblique positioning of the cutter improved cutting of the plastic strand is achieved in some grades of plastics to be granulated. In the case of an oblique positioning of the blade bodies, the shaped faces which delimit the cutting edge are preferably configured so as to be curved, specifically in such a manner that despite increasing wear of the blade body and the readjustment of the cutter head which is required on account thereof, the end points of the cutting edge remain substantially on the same reference circles on the perforated plate of the extruder, that is to say such that the cutting edge does not creep inward as wear increases.

The advantage of the cutter head according to the invention lies in that, by way of simple replacement of the cutter elements, fitting of straight blades and also obliquely placed blades is possible, using the same rotor basic body.

Should, on account of the specification of the application in hand, one or the other configuration of the blades prove to be more favorable, then only the set of cutter elements on the rotor basic body has to be replaced.

In the case of the cutter head according to the invention, mounting the cutter elements is particularly simple. The cutter head of an underwater granulating machine is usually designed such that it can be pulled off from the perforated plate of the extruder for cleaning and maintenance purposes, specifically along with the surrounding housing elements which enable sealing for the water circuit. The cutter head is then freely accessible from the end side. In the case of the cutter head according to the invention, the cutter elements can be replaced from the end side, without any lateral attachment parts having to be removed or the cutter head having to be taken off the rotor shaft.

On account of the preferred additional form-fitting coupling of the cutter elements to the rotor basic body, the cutter element is correctly positionally oriented in an automatic manner, without readjustment works being required on the newly mounted cutter element.

It is possible for the form-fitting elements between the cutter element and the rotor head to be configured in the form of an interference fit, such that completely gauged and sharpened cutter elements can be inserted into the respective position on the cutter head.

According to a preferred embodiment, it is provided in relation to the form-fitting elements that a pin which engages in a corresponding depression in the cutter holder on the rotor head projects from the lower side of the basic body of the cutter element. The reverse arrangement having a pin on the cutter holder and a depression on the cutter element is also possible.

Pins and recesses may be cylindrically shaped. However, other shapes are also possible, such as rectangular web shapes which have the effect of a more favorable flank pressing, for example.

Preferably, each cutter element possesses a blade body having one cutting edge. This has the advantage that in the case of damage to a cutting edge only the damaged cutter element can be replaced in a targeted manner.

However, it is also possible for a cutter element which possesses a plurality of blade bodies which are interconnected by way of a common basic body to be provided. Segments having a plurality of blades which are fastenable on the rotor basic body by way of a few fastening elements may be prefabricated, such that a replacement of a complete cutter set is possible in a faster manner.

The invention is explained in more detail in the following with reference to the drawings. In detail:

Figure 1:
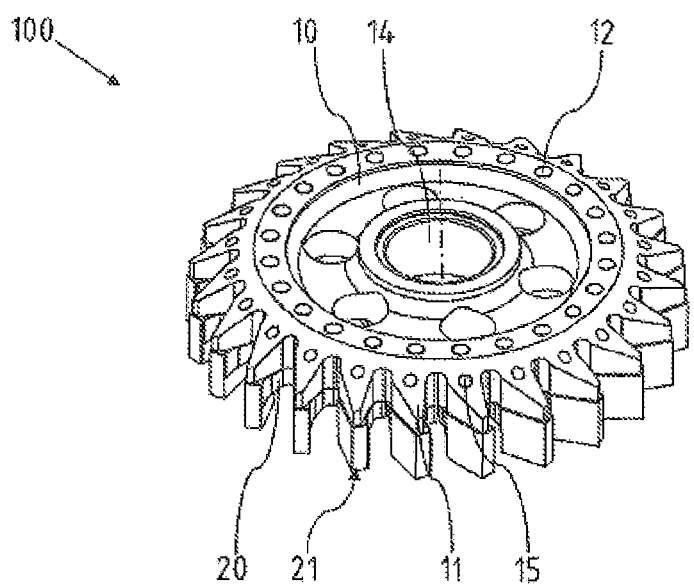
FIG. 1 shows a mounted cutter head according to a first embodiment, having cutter elements which are oriented in a straight manner, in a perspective view seen from the rear side.

FIG. 1 shows a mounted cutter head 100 which is substantially composed of a gear-wheel type rotor basic body 10 and a multiplicity of cutter elements 20 attached thereon.

The rotor basic body 10, for fastening on a rotor shaft, possesses a central bore 14. Adjoining thereto on the outer circumference, there are a multiplicity of cutter-retaining arms 11 which taper in an outward manner, similar to the flanks of a tooth on a gear wheel, wherein the cutter-retaining arms 11, however, do not extend outward in a precisely radial manner but are preferably set at an angle of 35° to 55° in relation to the radius or diameter, respectively, other angles also being possible. The oblique positioning of the cutter-retaining arms 11 in relation to the diameter leads to a cutting edge 21 on the cutter element 20 completing a cut on the pull stroke when it encounters the granulate strand exiting from the perforated plate.

Cross section and orientation of the cutter-retaining arms 11 are chosen such that overlapping by way of the cutter element 20 placed thereupon takes place, so that no projecting edges which would be an obstacle to the removal of the granulate exist.

A glance onto the rear side of the rotor basic body 10 in FIG. 1 also identifies threaded bores 12 for receiving a fastening screw, and additional recesses 15 by way of which in each case a form-fitting coupling to a pin on the cutter element 20 is effected.

Figure 2:
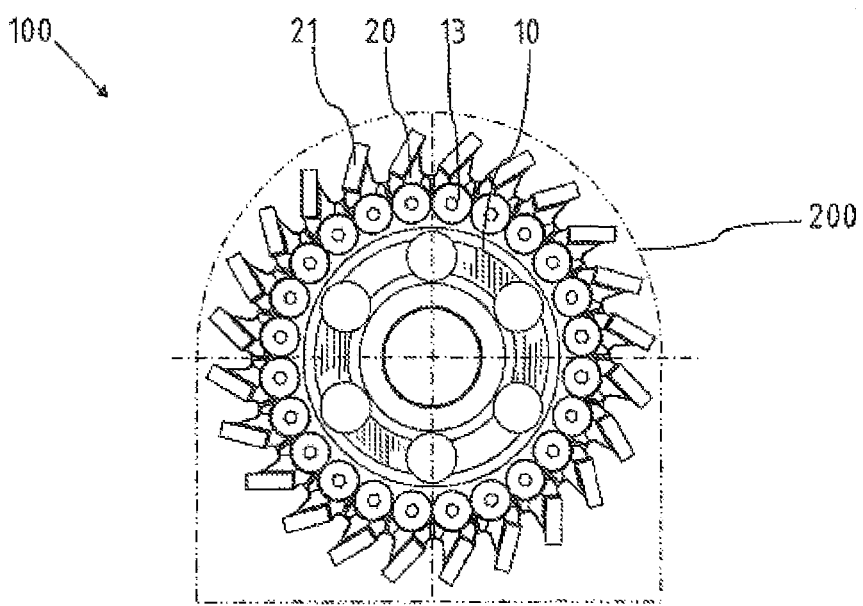
FIG. 2 shows the cutter head from FIG. 1, in a plan view onto the front side.

FIG. 2 shows the cutter head from the front side, that is to say when viewed from the extruder. The view shown here corresponds to the view of a cutter head 100 in an underwater granulating installation, which has been pulled off from the nozzle plate of the extruder. The dot-and-dash line indicates casing parts 200 which, in the cutter head 100 according to the invention, in no way constitute an obstacle when mounting the cutter elements 20.

Figure 6:
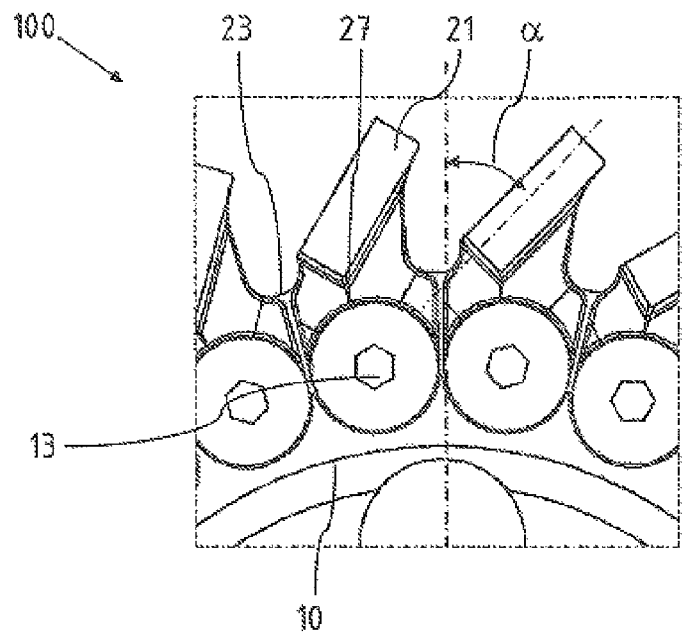
FIG. 6 shows an enlarged detail from FIG. 2.

FIG. 6 shows an enlarged detail from FIG. 2. The stress-optimized design of the cutter elements 20 is identifiable here. The actual cutting edge 21 forms part of a plate-type blade body 22 which transitions into a basic body 23. Ribs 27 reinforce the transitional region. The cutting edge 21 is obliquely set at an angle α=35° . . . 55° in relation to the diameter. The heads of the fastening screws 13 lie so as to be recessed in an abatement on the basic body 23 of the cutter element 20. The basic bodies 23 here possess a trapezoidal footprint, so as to enable a dense arrangement of cutter elements 20 on the provided reference circle.

Figure 3A:
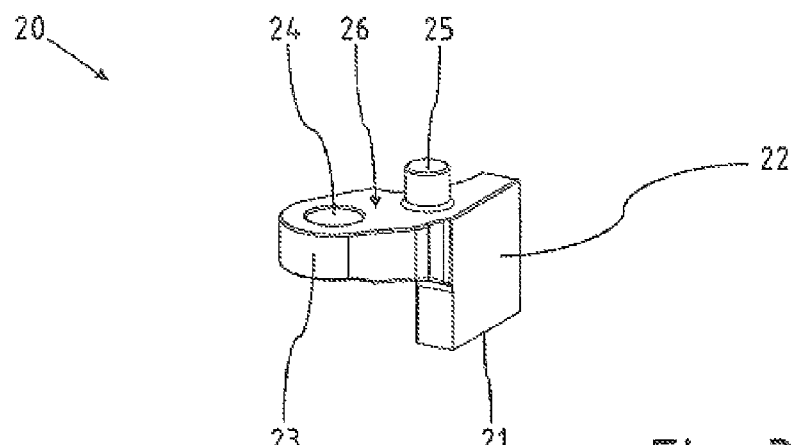
FIGS. 3a, 3b show a cutter element having straight blade elements, in each case in various perspective views.

FIG. 3a shows a single cutter element 20 in a perspective view onto the lower side which forms a bearing face 26 by way of which the cutter element 20 is placed upon the rotor basic body 10 and the cutter-retaining arms 11. A plate-shaped blade body 22 is unified with a basic body 23 to form the cutter element 20. A pin 25 and a bore 24 are disposed on the bearing face 26.

Figure 3B:
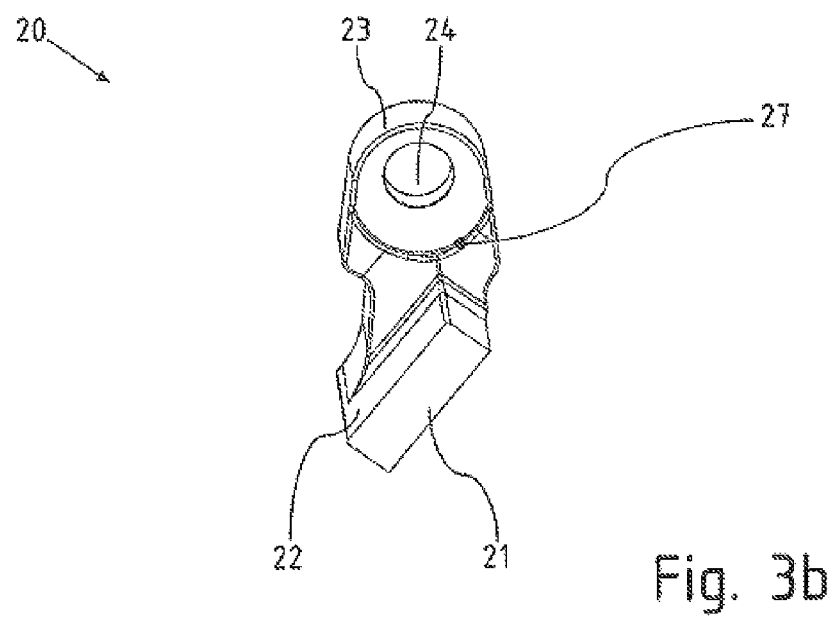

FIG. 3b shows the cutter element 20 from the front. The ribs 27 on the transition from the blade body 22 to the basic body 23, and the abatement around the bore 24 for receiving the screw head, are clearly identifiable.

Figure 4:
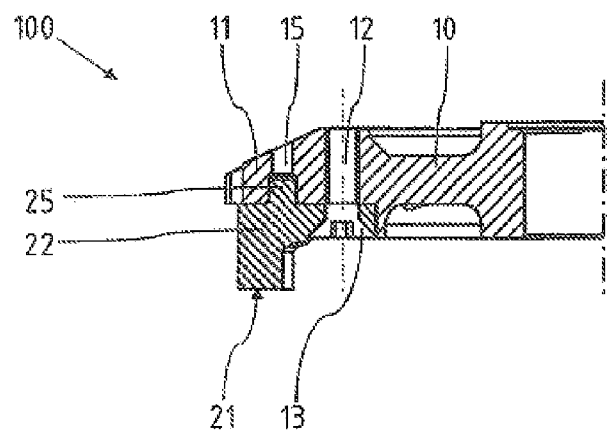
FIG. 4 shows the fastening of a cutter element on the rotor basic body, in a section.

As shown by the sectional illustration in FIG. 4, the bore 24 in the basic body 23 serves for passing through the fastening screw 13. The pin 25 engages into the recess 15 on the cutter-retaining arm 11 and thus effects a form-fitting fixation of the cutter element 20 in all directions which are transverse to the rotation axis of the cutter head 100. By means of a suitable tool, the mounted cutter element 20 can be driven out through the bore 15 which is open toward the bottom.

Figure 5:
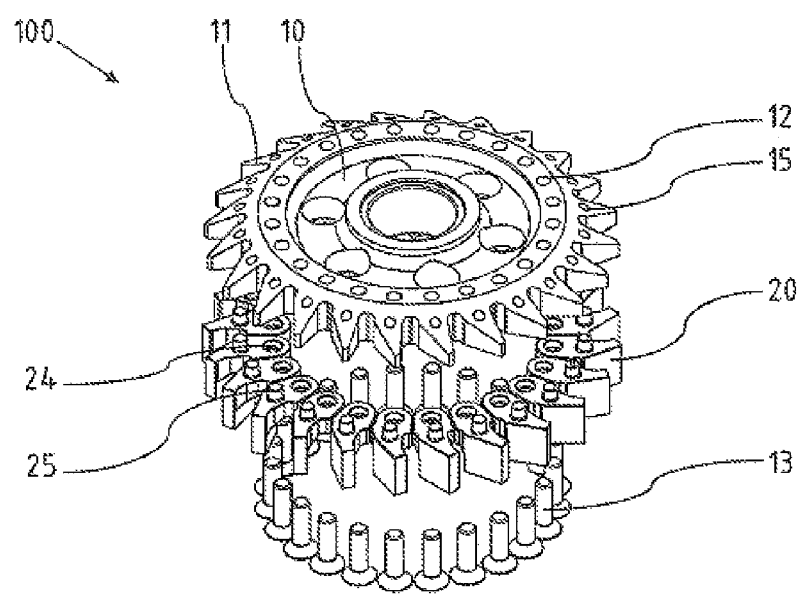
FIG. 5 shows the non-mounted cutter head according to the first embodiment, in a perspective exploded illustration, seen from the rear side.

FIG. 5 shows the cutter head 100 in an exploded illustration, in the positionally correct arrangement of the parts in relation to one another. The cutter elements 20 have only to be placed upon the rotor basic body 10 such that the pin 25 engages in the bore 15. Thereafter, the cutter element 20 is secured by way of the screw 13.

Figure 7:
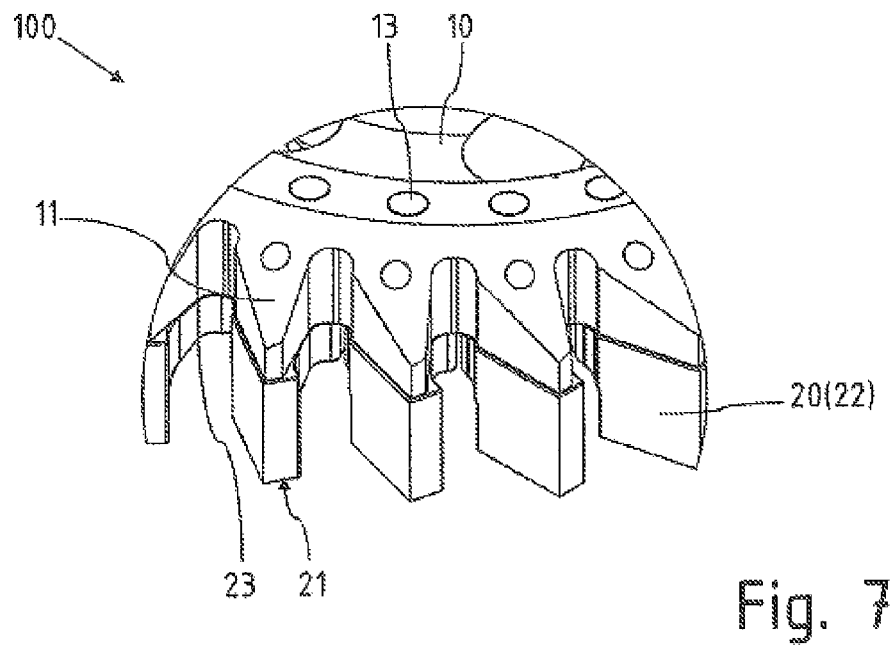
FIG. 7 shows details of a perspective view of the mounted cutter head, seen from the outer circumference.

FIG. 7 shows a glance from the outer periphery onto the intermediate spaces between the individual cutter-retaining arms 11, or the cutter elements 20, respectively. The cross sections of the cutter elements 20 overlap the cutter-retaining arms 11. The intermediate spaces are thus free from protrusions or screw heads and enable unobstructed removal of the granulate. At the same time, the cutter-retaining arms 11 have the effect of a good support of the cutter elements 20 in relation to forces which act in the direction of the rotation axis and, on account of the additional form-fitting coupling, also in relation to forces which act in a transverse manner thereto.

Figure 8:
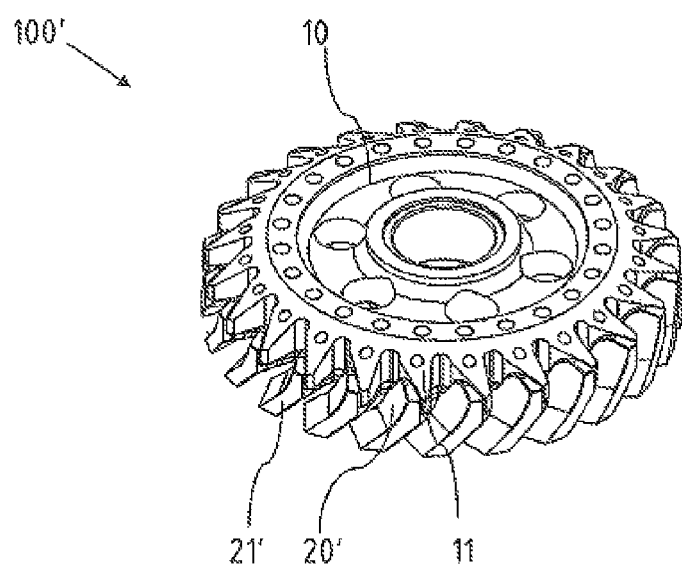
FIG. 8 shows a mounted cutter head according to a second embodiment, having obliquely oriented blade elements, in a perspective view seen from the rear side.

FIG. 8 shows a second embodiment of the cutter head 100' according to the invention. Cutter elements 20' having an obliquely set cutting edge 21' are attached thereto. The rotor basic body 10 having the cutter-retaining arms 11 of the first embodiment of the cutter head 100 may be employed here without modification.

Figure 9:
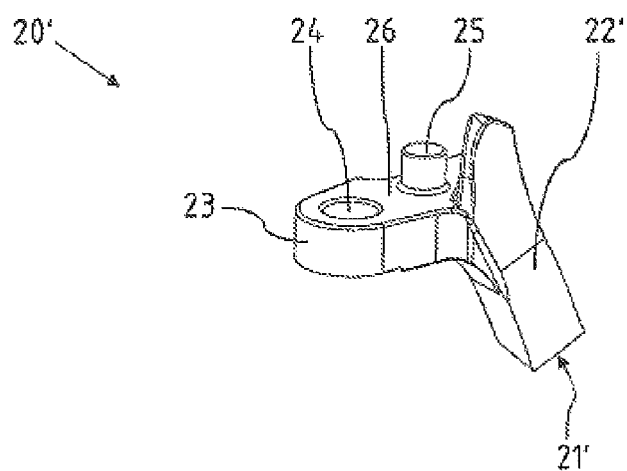
FIG. 9 shows a cutter element having an oblique blade element, in a perspective view.

Only the cutter elements 20' of which one is illustrated in a perspective manner in FIG. 9 are configured in a different manner. Again, they are preferably configured as integrally shaped parts, wherein the basic body 23 having the bore 24, the pin 25, and the bearing face 26, in principle, also has to be modified in relation to the first embodiment of the cutter element 20 which is illustrated in FIGS. 3a, 3b. Only the blade body 22' is configured in a different manner. Said blade body 22' is extended toward the rearward side beyond the bearing face 26, in order to enable the granulate to be conveyed away in an unobstructed manner past the cutter-retaining arms 11.

In this manner, in the invention the cutter elements 20 having straight cutting edges or the cutter elements 20' having oblique cutting edges may be selectively attached on a standard rotor basic body 10.

Figure 10:
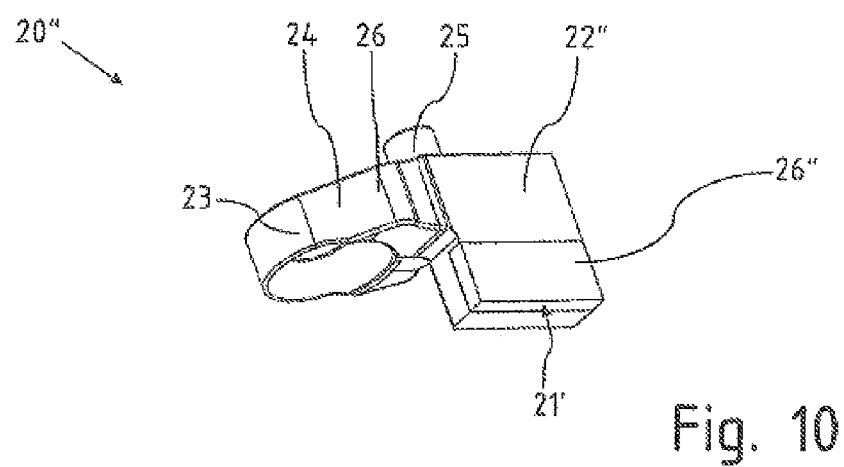
FIG. 10 shows a further cutter element having a straight blade element, in a perspective view.

FIG. 10 showed a cutter element 20" which is a slight variation of the first embodiment of the cutter element 20. The difference is that the basic body 23 and blade body 22" are indeed integrally configured, but that in the region of the blade body 22" another blade-insert element 26" which, for example, is formed from a particularly hard and wear-resistant material is inserted and bonded thereon in a materially integral manner.

The invention claimed is:

1. A cutter head for an underwater granulating installation, the cutter head comprising:
    a rotor body having an outer circumference;
    a plurality of cutter-retaining arms, each cutter-retaining arm of the plurality of cutter-retaining arms adjoining the outer circumference of the rotor body; and
    a cutter element fastened on each cutter-retaining arm, the cutter element having a recess therein configured to receive a fastening element, such that when the fastening element is in the recess, the fastening element does not protrude past the cutter element on a surface not fastened to the cutter-retaining arm,
    wherein the rotor body is adjacent to each cutter-retaining arm and includes at least one receptacle recess configured to receive a fastening element,
    wherein the cutter element directly contacts a basic body and at least one blade body, the basic body having a bearing face configured to contact the rotor body, the bearing face extending up to at least one of the plurality of cutter-retaining arms,
    wherein the cutter element overlaps with at least one of the plurality of cutter-retaining arms on an upper side, and
    wherein the blade body includes at least one cutting edge having an embedded blade-insert element integrally affixed to the blade body, such that the blade-insert element is fixed to the blade body.

2. The cutter head of claim 1 wherein the basic body includes at least one bore configured to allow the fastening element to pass therethrough, the basic body further including a form-fitting element thereon configured to engage with a form-fitting element of the rotor body.

3. The cutter head of claim 1, wherein the at least one receptacle recess for the fastening element is disposed on the rotor body outside the plurality of cutter-retaining arms.

4. The cutter head of claim 1, wherein the fastening element is a screw, and the at least one receptacle recess is a threaded bore.

5. The cutter head of claim 2, wherein the form-fitting element on the rotor body is a recess or a depression, and the form-fitting element on the basic body of the cutter element is a pin.

6. The cutter head of claim 2, wherein the form-fitting element on the rotor body is a pin, and the form-fitting element on the basic body of the cutter element is a recess or a depression.

7. The cutter head of claim 1, wherein the at least one cutting edge is oriented to be parallel to the central axis of the basic body.

8. The cutter head of claim 1, wherein the at least one cutting edge is obliquely set in relation to the central axis of the basic body.

9. The cutter head of claim 1, wherein the plurality of cutter-retaining arms taper from a base on the basic body toward a tip region on the outer circumference.

10. The cutter head of claim 9, wherein a centerline of at least one of the plurality of cutter-retaining arms is set at an angle of 35° to 55° in relation to the diameter of the basic body, the centerline extending from the base to the tip region.

11. The cutter head of claim 1, wherein the cutter element is provided with a surface coating.

12. The cutter head of claim 1, wherein the cutter element completely overlaps with at least one of the plurality of cutter-retaining arms on the upper side.

13. The cutter head of claim 12, wherein the cutter element completely overlaps with all of the cutter-retaining arms.

14. The cutter head of claim 1, further comprising a form-fitting element disposed adjacent the cutter element and at least one of the plurality of cutter-retaining arms.

* * * * *